(12) United States Patent
Fisher-Stawinski et al.

(10) Patent No.: US 12,306,928 B2
(45) Date of Patent: May 20, 2025

(54) PASSWORD MANAGER ACCESSORY

(71) Applicant: International Business Machines Corporation, Armonk, NY (US)

(72) Inventors: Steven Lee Fisher-Stawinski, Buffalo Grove, IL (US); Shikhar Kwatra, San Jose, CA (US); Moitreyee Mukherjee-Roy, San Jose, CA (US); Scott E. Schneider, Rolesville, NC (US)

(73) Assignee: International Business Machines Corporation, Armonk, NY (US)

( * ) Notice: Subject to any disclaimer, the term of this patent is extended or adjusted under 35 U.S.C. 154(b) by 630 days.

(21) Appl. No.: 17/201,431

(22) Filed: Mar. 15, 2021

(65) Prior Publication Data

US 2022/0292179 A1    Sep. 15, 2022

(51) Int. Cl.
*G06F 21/45* (2013.01)
*G06F 3/04886* (2022.01)
*H04L 9/40* (2022.01)

(52) U.S. Cl.
CPC .......... *G06F 21/45* (2013.01); *G06F 3/04886* (2013.01); *H04L 63/083* (2013.01)

(58) Field of Classification Search
CPC .......... G06F 21/34; G06F 21/45; G06F 21/46; G06F 2221/2153; G06F 2221/2129; H04L 63/083
See application file for complete search history.

(56) References Cited

U.S. PATENT DOCUMENTS 6,182,229 B1  1/2001  Nielsen
7,092,915 B2  8/2006  Best
(Continued)

FOREIGN PATENT DOCUMENTS

CN  202523067 U  11/2012
CN  102843422 A  12/2012
(Continued)

OTHER PUBLICATIONS

"Everykey—No more Passwords, No more Keys," Everykey, accessed Jul. 23, 2020, 3 pages. <https://everykey.com/>.
"Hardware Password Manager," Hackaday.io, accessed Jul. 23, 2020, 11 pages. <https://hackaday.io/project/5588-hardware-password-manager>.
"Hardware Wallet," Bitcoin Wiki, accessed Jul. 23, 2020, 16 pages. <https://en.bitcoin.it/wiki/Hardware_wallet>.
(Continued)

*Primary Examiner* — Daniel B Potratz
(74) *Attorney, Agent, or Firm* — Tihon Poltavets

(57) ABSTRACT

Systems and methods are presented for a hardware accessory, with embedded logical features, that facilitates communication with a password manager and expeditious text entry in application login dialogue screens. The hardware accessory is embodied as a portable electronic apparatus, such as a USB accessory that may be physically attached and detached form a personal computer. The hardware accessory may also be embodied as a portable computing device such as a mobile phone that may be wirelessly coupled to and decoupled from the personal computer. The passwords may be maintained in a cloud-based vault and retrieved through either the personal computer or the mobile computing device. The hardware accessory converts the password into keystrokes that are transmitted to the personal computer for automated insertion into the respective application login dialogue screens.

17 Claims, 9 Drawing Sheets

(56) References Cited

U.S. PATENT DOCUMENTS

| | | | | |
|---|---|---|---|---|
| 7,743,409 | B2* | 6/2010 | Gonzalez | H04L 63/0853 |
| | | | | 713/184 |
| 2014/0137220 | A1 | 5/2014 | Niemela | |
| 2015/0089239 | A1 | 3/2015 | Yang | |
| 2017/0093862 | A1* | 3/2017 | DeLuca | H04L 63/10 |
| 2018/0069704 | A1* | 3/2018 | Dray, Jr. | H04L 9/3247 |
| 2018/0121655 | A1* | 5/2018 | Abene | H04W 12/068 |
| 2019/0020646 | A1* | 1/2019 | Magyar | G06F 21/41 |
| 2020/0074069 | A1* | 3/2020 | Rodriguez Bravo | |
| | | | | G06F 21/602 |
| 2020/0356389 | A1 | 11/2020 | Chandrasekhar | |
| 2022/0237282 | A1* | 7/2022 | Tzur-David | H04L 63/126 |

FOREIGN PATENT DOCUMENTS

| | | |
|---|---|---|
| CN | 202995740 U | 6/2013 |
| CN | 103902056 A | 7/2014 |
| CN | 103136489 B | 7/2015 |
| CN | 105072114 A | 11/2015 |
| CN | 106845203 A | 6/2017 |
| CN | 108228316 A | 6/2018 |
| CN | 209690918 U | 11/2019 |
| WO | 2012162128 A1 | 11/2012 |

OTHER PUBLICATIONS

"How to create a USB portable password manager on Windows," StickyPassword, accessed Jul. 23, 2020, 10 pages. <https://www.stickypassword.com/help/usb-portable-password-manager-on-windows-1092>.

"OnlyKey Hardware Password Manager," OnlyKey, accessed Jul. 23, 2020, 13 pages. <https://onlykey.io/>.

"Zamek: The Offline Pocket Password Manager," Hackaday.io, accessed Jul. 23, 2020, 12 pages. <https://hackaday.io/project/3555-zamek-the-offline-pocket-password-manager>.

Mah, "How to set up a portable, non-cloud-based password manager," CSO, Mar. 30, 2016, 9 pages. <https://www.csoonline.com/article/3049416/how-to-set-up-a-portable-non-cloud-based-password-manager.html>.

Mell et al., "The NIST Definition of Cloud Computing," Recommendations of the National Institute of Standards and Technology, U.S. Department of Commerce, Special Publication 800-145, Sep. 2011, 7 pages.

PCT/CN2022/077445 International Search Report and Written Opinion, mailed May 11, 2022.

* cited by examiner

PASSWORD MANAGER ACCESSORY

BACKGROUND

The present disclosure relates to a password manager accessory, and, more specifically, to a hardware accessory, with embedded logical features.

Many known security features and applications for computing devices are configured to minimize the risk associated with allowing access to the device and applications through unauthorized access. Password protection is one mechanism to prevent such unauthorized access, where such protection significantly reduces a popular vector for attack on computing devices. Modern password features typically require strong, unique passwords for a myriad of services. The passwords are typically required to be a minimum number of characters, a mix of alphanumeric characters and symbols, where the passwords need to be changed on a periodic basis. Using the same password for all services is typically discouraged, and in some case, not possible due to the varying password requirements between services. In general, memorization of more than a few passwords is difficult and there are a number of known, commercially available password management tools configured to assist users. At least two known password management tools include cloud-based vaults and universal serial bus (USB) devices that store passwords and enter them through a simulated keyboard.

SUMMARY

An apparatus and methods are provided for a hardware accessory, with embedded logical features, that facilitates communication with a password manager and expeditious text entry in application login dialogue screens.

In one aspect, an electronic apparatus is provided as a hardware accessory, with embedded logical features, that facilitates communication with a password manager and expeditious text entry in application login dialogue screens. The electronic apparatus includes an electronic interface operatively coupled to a computing device. The computing device includes a processing device and a local password manager client communicatively coupled to the processing device. The electronic apparatus includes a password manager module communicatively coupled to the electronic interface. The password manager module is configured to communicate with the local password manager client. The electronic apparatus also includes a virtual keyboard module communicatively coupled to the password manager module. The virtual keyboard module is configured to present a logical keyboard to the processing device via the electronic interface. The password manager is configured to receive a password from the local password manager client via the electronic interface and transmit the password to the virtual keyboard module. The virtual keyboard module is configured to transmit one or more keystrokes to the processing device via the electronic interface.

In yet another aspect, a computer-implemented method is provided for using a hardware accessory, with embedded logical features, that facilitates communication with a password manager and expeditious text entry in application login dialogue screens. The method includes interfacing electronically, via a physically detachable interface, a physically detachable password manager hardware accessory, with a computing device. The computing device includes a processing device. The method includes receiving, at a password manager module embedded within the password manager hardware accessory, via the electronic interface, a password from a local password manager client from the computing device via the processing device. The method also includes transmitting the password from the password manager module to a virtual keyboard module embedded within the password manager hardware accessory. The method further includes converting, at the virtual keyboard module, the password into one or more keystrokes. The method also includes transmitting the one or more keystrokes from the virtual keyboard module to the processing device via the electronic interface.

In yet another aspect, a computer-implemented method is provided for using a hardware accessory, with embedded logical features, that facilitates communication with a password manager and expeditious text entry in application login dialogue screens. The method includes registering, via an electronic interface, a password manager hardware accessory at a first computing device. The first computing device includes a first processing device and the password manager hardware accessory includes a second processing device. The method also includes receiving, at the first computing device, one or more keystrokes defining a password from a virtual keyboard module on the password manager hardware accessory via the electronic interface. The password is retrieved from a password vault resident in a cloud-based computing environment.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
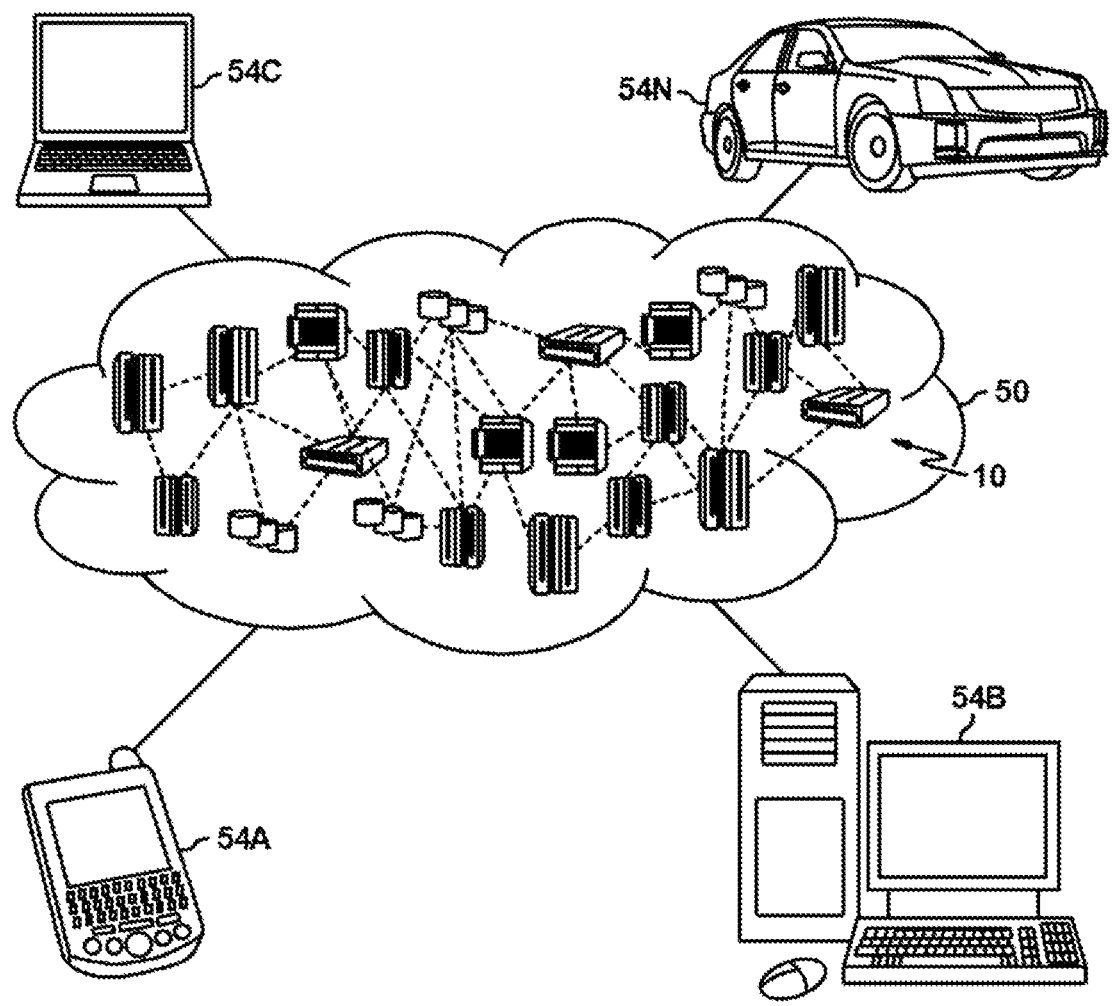
FIG. 1 is a schematic diagram illustrating a cloud computer environment, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments. In addition, it will be appreciated that, although specific embodiments have been described herein for purposes of illustration, various modifications may be made without departing from the spirit and scope of the embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
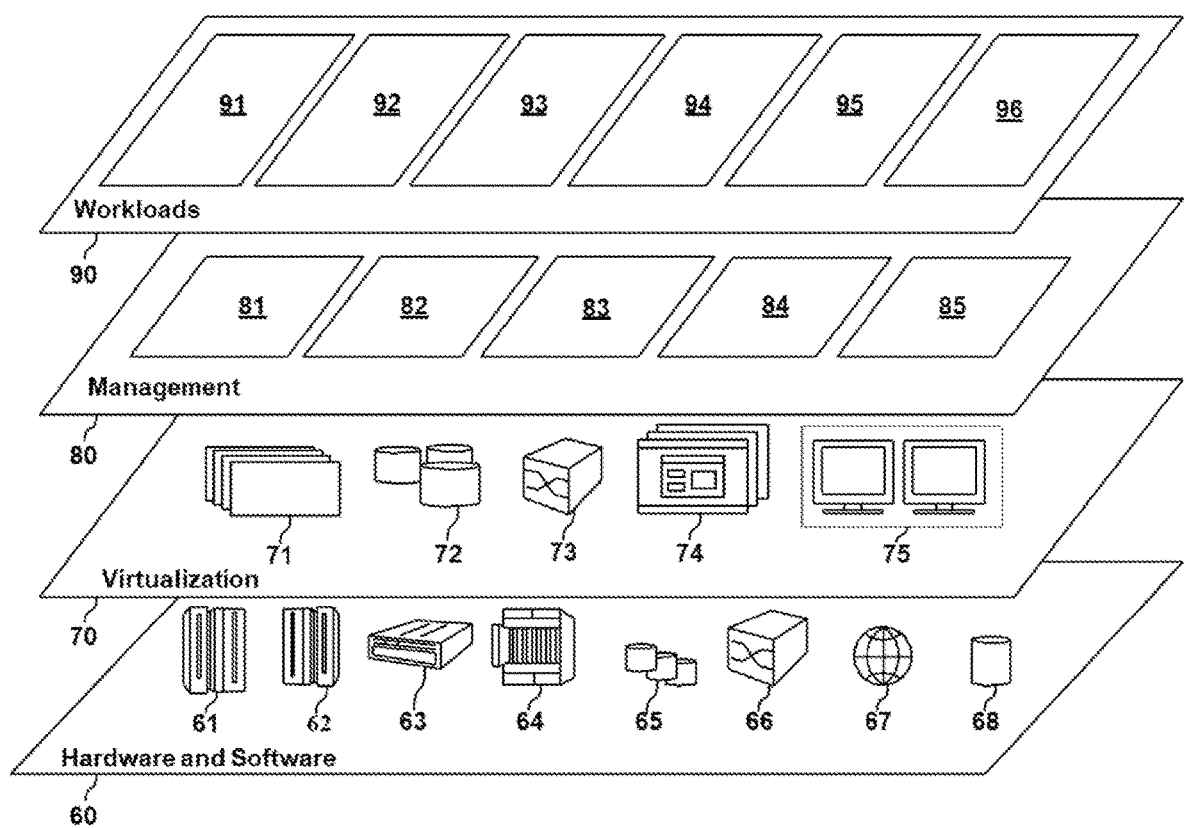
FIG. 2 is a block diagram illustrating a set of functional abstraction model layers provided by the cloud computing environment, in accordance with some embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and using a hardware accessory, with embedded logical features, to facilitate communication with a password manager and expeditious text entry in application login dialogue screens 96.

Figure 3:
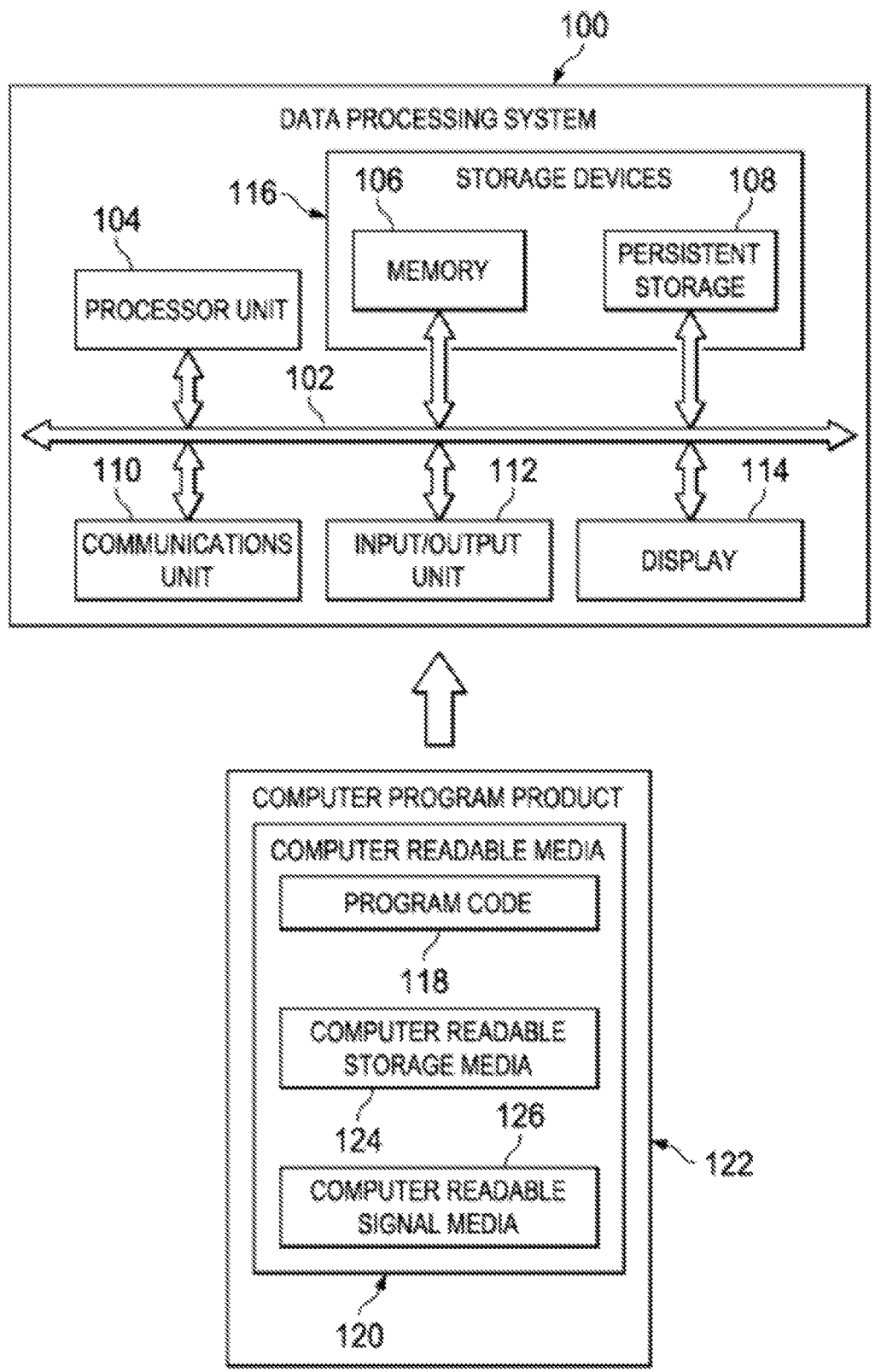
FIG. 3 is a block diagram illustrating a computer system/server that may be used as a cloud-based support system, to implement the processes described herein, in accordance with some embodiments of the present disclosure.

Referring to FIG. 3, a block diagram of an example data processing system, herein referred to as computer system 100, is provided. System 100 may be embodied in a computer system/server in a single location, or in at least one embodiment, may be configured in a cloud-based system sharing computing resources. For example, and without limitation, the computer system 100 may be used as a cloud computing node 10.

Aspects of the computer system 100 may be embodied in a computer system/server in a single location, or in at least one embodiment, may be configured in a cloud-based system sharing computing resources as a cloud-based support system, to implement the system, tools, and processes described herein. The computer system 100 is operational with numerous other general purpose or special purpose computer system environments or configurations. Examples of well-known computer systems, environments, and/or configurations that may be suitable for use with the computer system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

The computer system 100 may be described in the general context of computer system-executable instructions, such as program modules, being executed by the computer system 100. Generally, program modules may include routines, programs, objects, components, logic, data structures, and so on that perform particular tasks or implement particular abstract data types. The computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, the computer system 100 is shown in the form of a general-purpose computing device. The components of the computer system 100 may include, but are not limited to, one or more processors or processing devices 104 (sometimes referred to as processors and processing units), e.g., hardware processors, a system memory 106 (sometimes referred to as a memory device), and a communications bus 102 that couples various system components including the system memory 106 to the processing device 104. The communications bus 102 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computer system 100 typically includes a variety of computer system readable media. Such media may be any available media that is accessible by the computer system 100 and it includes both volatile and non-volatile media, removable and non-removable media. In addition, the computer system 100 may include one or more persistent storage devices 108, communications units 110, input/output (I/O) units 112, and displays 114.

The processing device 104 serves to execute instructions for software that may be loaded into the system memory 106. The processing device 104 may be a number of processors, a multi-core processor, or some other type of processor, depending on the particular implementation. A number, as used herein with reference to an item, means one or more items. Further, the processing device 104 may be implemented using a number of heterogeneous processor systems in which a main processor is present with secondary processors on a single chip. As another illustrative example, the processing device 104 may be a symmetric multi-processor system containing multiple processors of the same type.

The system memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The system memory 106, in these examples, may be, for example, a random access memory or any other suitable volatile or non-volatile storage device. The system memory 106 can include computer system readable media in the form of volatile memory, such as random access memory (RAM) and/or cache memory.

The persistent storage 108 may take various forms depending on the particular implementation. For example, the persistent storage 108 may contain one or more components or devices. For example, and without limitation, the persistent storage 108 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the communication bus 102 by one or more data media interfaces.

The communications unit 110 in these examples may provide for communications with other computer systems or devices. In these examples, the communications unit 110 is a network interface card. The communications unit 110 may provide communications through the use of either or both physical and wireless communications links.

The input/output unit 112 may allow for input and output of data with other devices that may be connected to the computer system 100. For example, the input/output unit 112 may provide a connection for user input through a keyboard, a mouse, and/or some other suitable input device. Further, the input/output unit 112 may send output to a printer. The display 114 may provide a mechanism to display information to a user. Examples of the input/output units 112 that facilitate establishing communications between a variety of devices within the computer system 100 include, without limitation, network cards, modems, and input/output interface cards. In addition, the computer system 100 can communicate with one or more networks such as a local area network (LAN), a general wide area network (WAN), and/or a public network (e.g., the Internet) via a network adapter (not shown in FIG. 3). It should be understood that although not shown, other hardware and/or software components could be used in conjunction with the computer system 100. Examples of such components include, but are not limited to: microcode, device drivers, redundant processing units, external disk drive arrays, RAID systems, tape drives, and data archival storage systems.

Instructions for the operating system, applications and/or programs may be located in the storage devices 116, which are in communication with the processing device 104 through the communications bus 102. In these illustrative examples, the instructions are in a functional form on the persistent storage 108. These instructions may be loaded into the system memory 106 for execution by the processing device 104. The processes of the different embodiments may be performed by the processing device 104 using computer implemented instructions, which may be located in a memory, such as the system memory 106. These instructions are referred to as program code, computer usable program code, or computer readable program code that may be read and executed by a processor in the processing device 104. The program code in the different embodiments may be embodied on different physical or tangible computer readable media, such as the system memory 106 or the persistent storage 108.

The program code 118 may be located in a functional form on the computer readable media 120 that is selectively removable and may be loaded onto or transferred to the computer system 100 for execution by the processing device 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the computer system 100. In some instances, the computer readable storage media 124 may not be removable from the computer system 100.

Alternatively, the program code 118 may be transferred to the computer system 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or computer system through the computer readable signal media 126 for use within the computer system 100. For instance, program code stored in a computer readable storage medium in a server computer system may be downloaded over a network from the server to the computer system 100. The computer system providing the program code 118 may be a server computer, a client computer, or some other device capable of storing and transmitting the program code 118.

The program code 118 may include one or more program modules (not shown in FIG. 3) that may be stored in system memory 106 by way of example, and not limitation, as well as an operating system, one or more application programs, other program modules, and program data. Each of the operating systems, one or more application programs, other program modules, and program data or some combination thereof, may include an implementation of a networking environment. The program modules of the program code 118 generally carry out the functions and/or methodologies of embodiments as described herein.

The different components illustrated for the computer system 100 are not meant to provide architectural limitations to the manner in which different embodiments may be implemented. The different illustrative embodiments may be implemented in a computer system including components in addition to or in place of those illustrated for the computer system 100.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer programs products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many known security features and applications for computing devices are configured to minimize the risk associated with allowing access to the device and applications through unauthorized access. Password protection is one mechanism to prevent such unauthorized access, where such protection significantly reduces a popular vector for attack on computing devices. Modern password features typically require strong, unique passwords for a myriad of services. The passwords are typically required to be a minimum number of characters, a mix of alphanumeric characters and symbols, where the passwords need to be changed on a periodic basis. Using the same password for all services is typically discouraged, and in some case, not possible due to the varying password requirements between services. In general, memorization of more than a few passwords is difficult and there are a number of known, commercially available password management tools configured to assist users. At least one known password management tool includes cloud-based vaults. At least one known password management tool includes universal serial bus (USB) devices that store passwords and enter them through a simulated keyboard. However, at least some of these known mechanisms to facilitate password memory and timely submission are rendered ineffective by certain applications that are configured to hinder filling of the password submission field or window through pasting a copied password, automated filling of the password submission space through using the aforementioned tools to type in the window, or providing no option to view the text characters in the password field. The inability to facilitate quick password entry without having to memorize all of the passwords may be time-consuming and discourages the use of strong and unique passwords through a password manager and encourages sub-optimal practices such as short passwords and password reuse.

At least some known cloud-based password management configurations include a local password manager client, i.e., a commercially available password management application that is communicatively coupled to a password vault in the cloud through an Internet connection. The subject configuration may be applied to a variety of platforms including personal computers and mobile devices. The password management application is also communicatively coupled to one or more browsers and applications resident on the platforms, where the browsers are configured to communicate with various websites in the cloud and the applications are configured to communicate with services in the cloud. The password management application communicates with the password vault on behalf of the applications and the browser. The platform and/or the applications may restrict communication between the password management application and the browser and/or applications.

At least some other known cloud-based password management configurations include a hardware-based password manager loaded on an external and detachable hardware device, such as a universal serial bus (USB) device that is inserted into a USB slot on the platform. The USB device includes a local password vault embedded thereon, with a simulated USB keyboard module or human interface device (HID). The USB device also includes external controls, e.g. buttons to facilitate operation of the USB device, thereby increasing the complexity of the use thereof. The external controls allow operation of the simulated USB keyboard module to access the local password vault to retrieve a password and convert the password to keyboard characters or keystrokes for the associated logon fields for the affected browsers and applications loaded on the platform. Because some such devices appear on the user's device to be substantially indistinguishable from a keyboard, these devices avoid some of the aforementioned drawbacks of cloud-based password management systems, such as with applications that disallow copy/paste actions in the password entry field. Since the passwords are stored locally on the USB device, they cannot be synchronized across devices and cannot be accessed through those devices with no USB port or other compatible hardware connection. In addition, such devices generally suffer from limited or fiddly interfaces for storing and retrieving the passwords. Moreover, such devices may constitute a security breach if lost or stolen due to the stored passwords thereon. Under some conditions, such devices may be susceptible to cracking attacks through brute force methods to attempt to obtain access to encrypted passwords resident on the device and decrypt them.

Apparatus and methods are disclosed and described herein for hardware accessories, with embedded logical features, that facilitates communication with a password manager and expeditious text entry in application login dialogue screens. The hardware accessories are electronic apparatus that include an electronic interface operatively coupled to a computing device that has a processing device and a local password manager client communicatively coupled to the processing device. In some embodiments, the hardware accessories include a password manager module that is communicatively coupled to the electronic interface and is configured to communicate with the local password manager client. The hardware accessories also include a virtual keyboard module communicatively coupled to the password manager module. The virtual keyboard module is configured to present a logical keyboard to the processing device via the electronic interface. The password manager is configured to receive a password from a cloud-based vault through the local password manager client and the electronic interface, transmit the password to the virtual keyboard module, where the virtual keyboard module is configured to transmit one or more keystrokes to the processing device via the electronic interface. Modern security features are used to maintain the necessary password security.

In some embodiments, the hardware accessories are configured as universal serial bus (USB) devices that may be inserted into a USB port of a personal computer. In such embodiments, the electronic interface is the USB interface and the local password manager client on the personal computer communicates with the cloud-based password vault to retrieve the requested password and/or synchronize a local copy of the cloud-based password vault form which to retrieve the requested password for transmission to the USB accessory device inserted into the personal computer. The password may be decrypted locally on the personal computer by the password manager and transmitted to the USB accessory in the clear or under new separate encryption, or alternatively, the password may be extracted from the vault with encryption maintained and transmitted to the USB accessor for decryption there. The USB accessory device includes a module that simulates a keyboard that generates the keystrokes from the decrypted password and transmits the keystrokes to the application or browser running on the personal computer for authentication of the user's credentials, including the password, for access to the web-based services through the respective application and or websites through the browser.

In some embodiments, the electronic interface is a wireless connection established between a personal computer and a mobile computing device, e.g., a mobile phone. In such embodiments, the local password manager client resident on the mobile device communicates with and/or synchronizes with a local copy of the cloud-based password vault to retrieve the requested password for decryption and transmission to the mobile device through communications channels external to the personal computer. The mobile device includes a module that simulates a keyboard that generates the keystrokes from the decrypted password and transmits the keystrokes to the application or browser running on the personal computer for authentication of the user's credentials, including the password, for access to the web-based services through the respective application and or websites through the browser.

Figure 4:
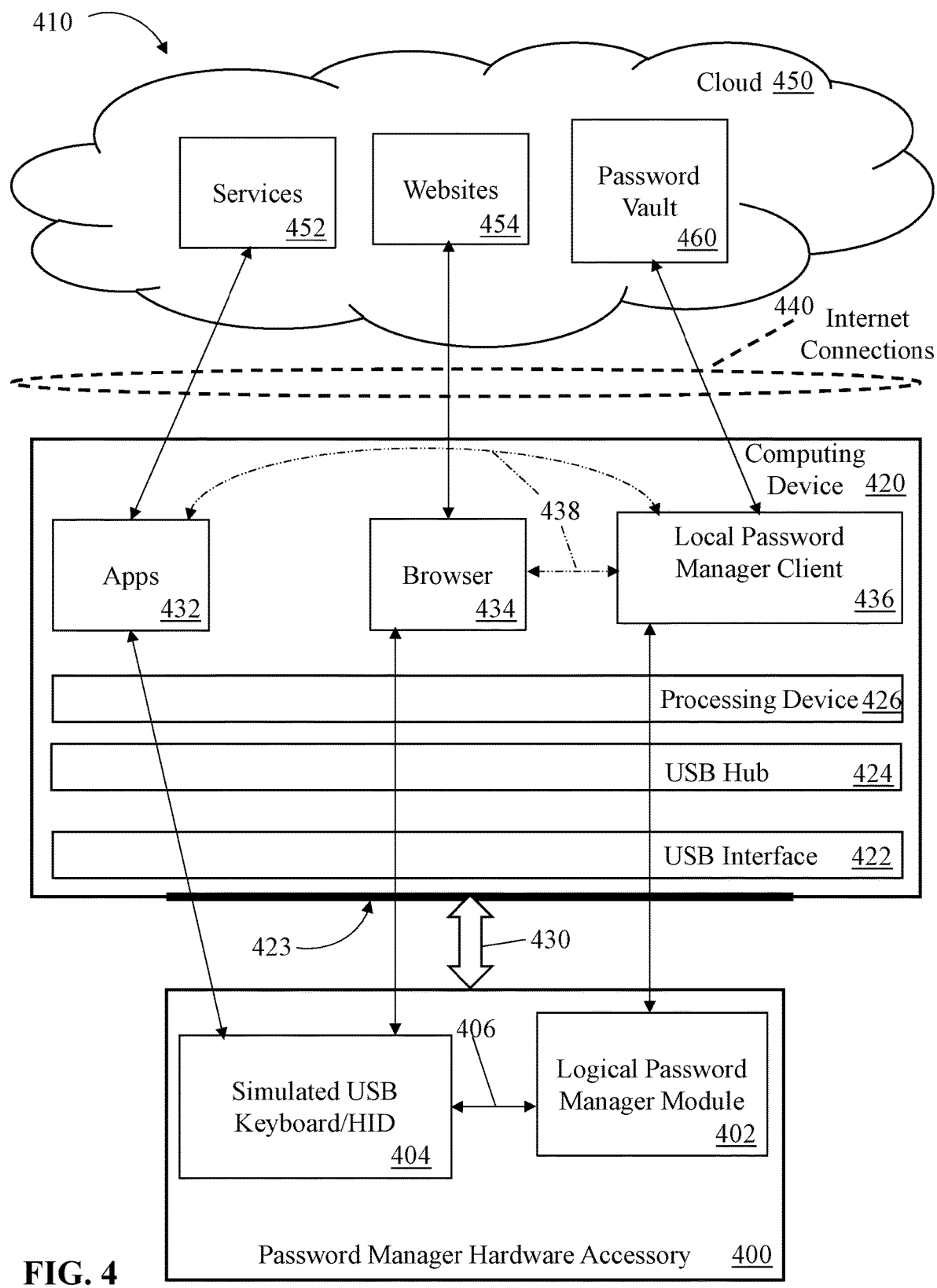
FIG. 4 is a block diagram illustrating an example configuration of a password manager hardware accessory, with embedded logical features, that facilitates communication with a password manager and expeditious text entry in application login dialogue screens, in accordance with some embodiments of the present disclosure.

FIG. 4 is a block diagram illustrating an example configuration of a password manager hardware accessory 400, herein referred to as "the accessory 400," with embedded logical features. The accessory 400 is an electronic apparatus that facilitates communication with a password manager as well as expeditious text entry in application login dialogue screens. The accessory 400 is shown embedded within a cloud-based computing environment 410 that is similar to the computing environment 50 as shown and described with respect to FIGS. 1 and 2. The computing environment 410 also includes a computing device 420 and the cloud 450, where the computing device 420 is similar to the computing system 100 (shown in FIG. 3). In embodiments, the computing device 420 is a personal computer.

The accessory 400 includes a logical password manager module 402 communicatively coupled to a simulated universal serial bus (USB) keyboard 404. In some embodiments, the simulated USB keyboard 404 is referred to as a human interface device (HID). The logical password manager module 402 is communicatively coupled to the simulated USB keyboard 404 through a communications conduit 406, where the communications conduit 406 is any technology that enables communication between the logical password manager module 402 and the simulated USB keyboard 404 as described herein.

The accessory 400 is coupled to the computing device 420. Therefore, the accessory 400 is configured as a peripheral device to the computing device 420. In some embodiments, the accessory is a key device physically configured as a USB key dongle, or fob, of the shape commonly used for storage devices. The computing device 420 includes an electronic interface, e.g., a USB interface 422 configured to receive the accessory 400, via a USB port 423 defined in the USB interface 422, through a physical coupling therebetween. The USB interface 422 is configured as an electronic interface for a physically detachable universal serial bus (USB) device, such as the accessory 400. An arrow 430 indicates insertion (attachment) and removal (detachment) of the accessory 400 from the USB interface 422. The computing device 420 also includes a USB hub 424 communicatively and operatively coupled to the USB interface 422 and a processing device 426 communicatively coupled to the USB hub 424. The processing device 426 is similar to the processing device 104 (shown in FIG. 3). The computing device 420 provides a platform for one or more applications 432 and browsers 434 that are resident therein. The computing device 420 further includes a local password manager client 436 that is, in at least some embodiments, configured as a password management application for a personal computer.

The computing device 420 is coupled to the cloud 450 through one or more Internet connections 440. A plurality of services 452 and websites 454 are resident within the cloud 450. In addition, one or more password vaults 460 (only one shown) are resident within the cloud 450. In at least some embodiments, the password vault 460 is configured to store an inventory of passwords. The services 452 are communicatively coupled to the applications 432, the websites are communicatively coupled to the browser 434, and the password vault 460 is communicatively coupled to the local password manager client 436, where the communications therebetween are transmitted through the Internet connections 440. The local password manager client 436 is communicatively coupled to the browser 434 and the applications 432 through communications channels 438 that are existing channels for soft-entry of passwords directly from the local password manager client 436.

The simulated USB keyboard 404 is communicatively coupled to the applications 432 and the browser 434. The logical password manager module 402 is communicatively coupled to the local password manager client 436. The communications between the accessory 400 and the components of the computing device 420 are transmitted through the USB hub interface 422, the USB hub 424, and the processing device 426. The simulated USB keyboard 404 is configured as a virtual keyboard module, that is further configured to present a logical keyboard to the computing device 420.

In one or more embodiments, the logical password manager module 402 is configured to receive a password from the local password manager client 436 via the electronic interface, i.e., the USB interface 422. In at least some embodiments, the accessory 400 is configured to limit its responses to certain application programs in the computing device 420, such as to the local password manager client 436 through an authentication process to initial an authenticated session. In such embodiments, the accessory 400 may be understood to ignore communications from applications that are not configured to perform the authentication process. In some embodiments, the logical password manager module 402 is configured with additional security features to facilitate strictly secure communications between the accessory and the computing device 420. For example, and without limitation, the accessory 400 may communicate with a mobile device, e.g., a smart phone through a wireless, e.g., Bluetooth interface for multi-factor authentication, or, in some embodiments, the mobile device may pass multi-factor authentication codes to the accessory 400 through the wireless link. In some embodiments, the logical device embodied as the simulated USB keyboard 404 need not be a virtual keyboard, and may instead be a HID configured to receive other user inputs. Such alternative user inputs include, and without limitation, a mouse subject to mouse gestures and mouse clicks from the user, a touchscreen to facilitate screen touches by the user, a microphone to support speech audio from the user, game controller button presses, stylus strokes, camera image input, biometric sensors, e.g., and without limitation, an electronic fingerprint identification pad, etc., where such devices may be configured to generate whatever challenge response is presented to the user. In addition, again, without limitation, timing devices may be integrated with one or more of the aforementioned devices to add further security to the login process. Such HID is also configured to transmit human interface device outputs to the computing device 420.

In some embodiments, the logical password manager module 402 may be authenticated to the computing device 420 through one or more signed tokens. In some embodiments, accessory 400 security may be improved through the use of a key pair, i.e., a public key encryption (PKE) through a private key that is preloaded on the accessory 400 through a read-only memory (ROM) device positioned within the accessory 400, and a public key is printed on a card or label and/or reported to the operating system on the computing device 420 by the accessory 400 upon request. In some embodiments, firmware resident with the accessory 400 may be signed to identify that it is provided from a trusted source using the private key. In some embodiments, the local password manager client 436 may be configured to generate a key pair and flash a programmable ROM (PROM) resident in the accessory 400 with the private key and the signature of the accessory's firmware, and then discard the private key. Where the public key is maintained by the local password manager client 436 to perform future verifications on the accessory 400. Accordingly, the accessory 400 is configured to only send keystrokes to the computing device 420 responsive to an authenticated session with the local password manager client 436. Otherwise, the accessory 400 will not transmit to any device through any means.

The logical password manager module 402 is further configured to transmit the password to the virtual keyboard module, i.e., the simulated USB keyboard 404 via the communications conduit 406. In addition, the simulated USB keyboard 404 is configured to receive the password from the logical password manager module 402, convert the password to one or more keystrokes, and transmit the one or more keystrokes to the processing device 426 via the USB interface 422.

In operation, and as described in further detail herein, a user physically inserts the accessory 400 into the USB interface 430 as shown by the arrow 430. Communication between the logical password manager client 436 and the logical password manager module is established through the USB interface 422, the USB hub 424, and the processing device 426. The USB configuration facilitates registering the accessory 400 as a plurality of logical devices on the USB hub 424, or USB bus. Specifically, in the illustrated embodiment, the simulated USB keyboard 404 and the logical password manager module 402 are registered with the computing device 420 as separate logical entities.

The local password manager client 436 is configured to communicate with the password vault 460 to collect a password from the vault 460 that the user needs for access to either one of the application 432 or the browser 434, and/or the services 452 and websites 454. The local password manager client 436 receives an encrypted password that is decrypted through the processing device 426 (in some embodiments, the password may already be decrypted) and is then transmitted to the logical password manager module 402 through the USB hub 424 and the USB interface 422. The logical password manager module 402 is also configured to transmit, through the communications conduit 406, the password to the simulated USB keyboard 404 for converting the password through generating individual keystrokes that represent the alphanumerics and symbols typically used to form passwords. The keystrokes are transmitted to the respective logon fields of the application 432 or the browser 434, that in turn may be transmitted to the respective service 452 or website 454 to establish a functional link between the user of the computing device 420 and the service 452 or the website 454. Upon completion of the conversion of the password to keystrokes and transmission of the keystrokes to the computing device 420, the password is discarded from the logical password manager module 402 so that passwords are not stored on the accessory 400. If desired, the accessory 400 may be physically detached from the USB port 423 as shown by the arrow 430.

In some embodiments, in order to facilitate overcoming the shift from the soft focus of the local password manager client 436 to the browser 434 and the applications 432 through the communications channels 438 (that are existing channels for soft-entry of passwords directly from the local password manager client 436), the accessory 400 may include an external hard button configured to control when the keystrokes are sent from the accessory 400 to the computing device 420. Alternatively, in some embodiments, the local password manager client 436 may be configured to specify a time period, e.g., without limitation, 5 seconds, for the user to click the appropriate focus, i.e., either the existing soft focus through the communications channels 438 or the accessory 400. Further, the rate at which the keystrokes are sent by the accessory 400 may be adjusted to better simulate human entry. For example, a constant or average number of keystrokes per unit time may be slowed relative to what is electronically possible, and further the time delay between individual keypresses may be varied based on one or more of historical human typing patterns, the distance between keys on a physical keyboard, or randomly.

Figure 5A:
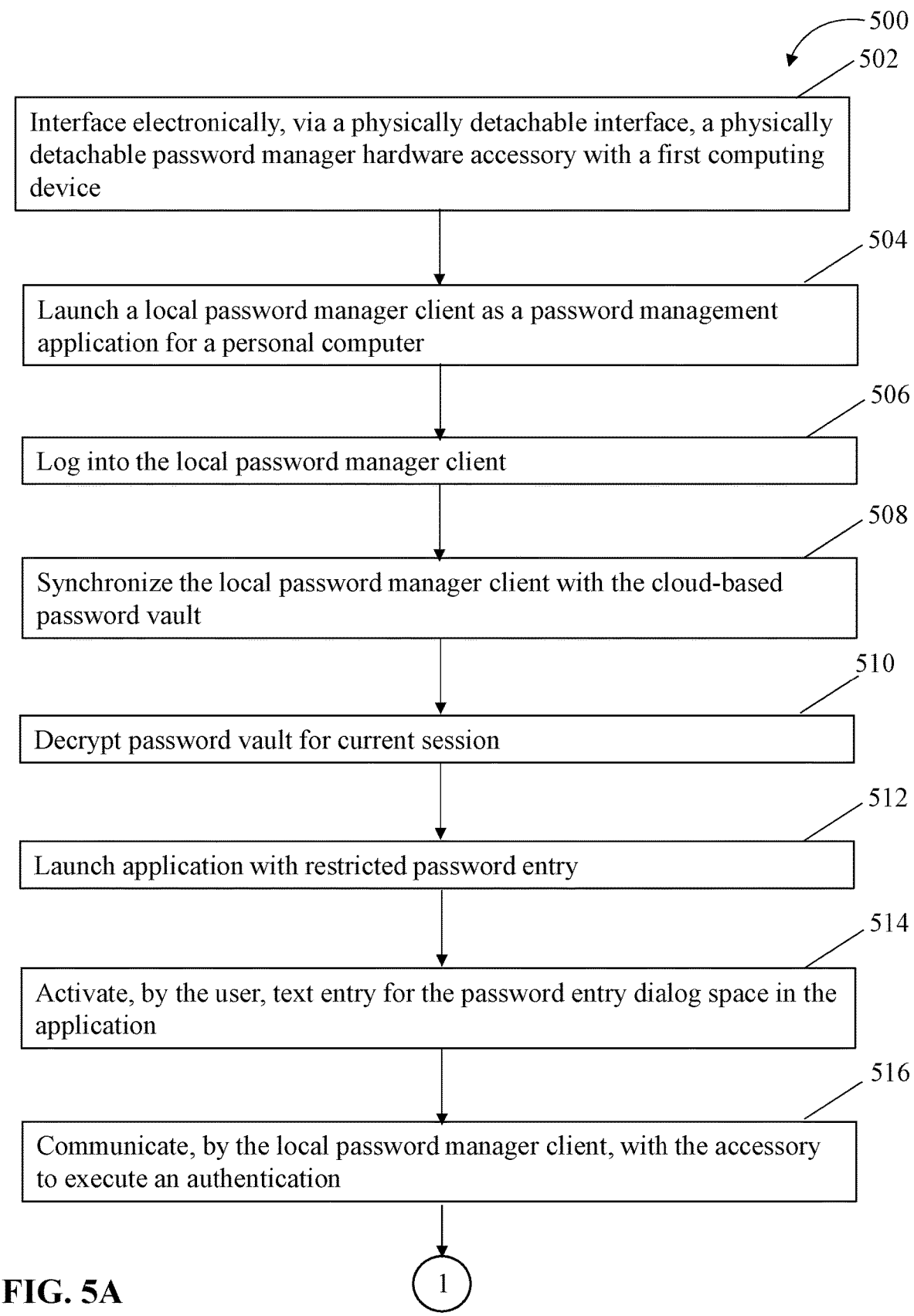
FIG. 5A is a flowchart illustrating a process for using a password manager hardware accessory for communicating with a password manager and facilitating expeditious text entry in application login dialogue screens, in accordance with some embodiments of the present disclosure.

Referring to FIG. 5A, a flowchart is provided illustrating a process 500 for using a password manager hardware accessory, such as the accessory 400 (shown in FIG. 4), for communicating with a password manager, such as the local password manager client 436 (shown in FIG. 4), and facilitating expeditious text entry in application login dialogue screens. Also referring to FIG. 4, in some embodiments, a user may want to enter a password into the respective password field of an application, browser, service, or website, and encounters text entry restrictions, e.g., there are no soft keyboard entry features associated with the password, i.e., no pasting a copied password permitted in the field, and the user may elect to use the process 500 in conjunction with the accessory 400. Specifically, the process 500 includes interfacing electronically 502, via a physically detachable interface, i.e., the USB port 423 defined in the USB interface 422, the physically detachable password manager hardware accessory 400 with the computing device 420. The process 500 also includes launching 504, by the user, the local password manager client 436 as a password management application for a personal computer. The user then logs 506 into the local password manager client 436. In some embodiments, a user may elect to couple the accessory 400 and launch the local password manager client 436 at the beginning of a computing session, such as sitting down to work in the morning, with the expectation of encountering a password challenge at some point later in the computing session.

In embodiments, the local password manager client 436 synchronizes 508 with the cloud-based password vault 460 and the local password manager client 436 decrypts 510 the passwords in the vault 460. In some embodiments, the local password manager client 436 may pull a copy of the password from the vault 460 and decrypt the password through the processing device 426. The user launches 512 an application 432 on the computing device 420, where the application 432 includes restricted password entry features. The user may also attempt to launch a password-restricted browser 434, attempt to initialize a password-restricted service 452, or access a password-restricted website 454, with similar restrictive password entry features, where similar actions as described for the application 432 will be executed. The user activates 514 the text entry for the password entry dialog space in the application 432 and the local password manager client 436 communicates 516 with the accessory 400 to execute the authentication protocols as configured. As previously described, the logical password manager module 402 is configured to be responsive only to the local password manager client 436.

Figure 5B:
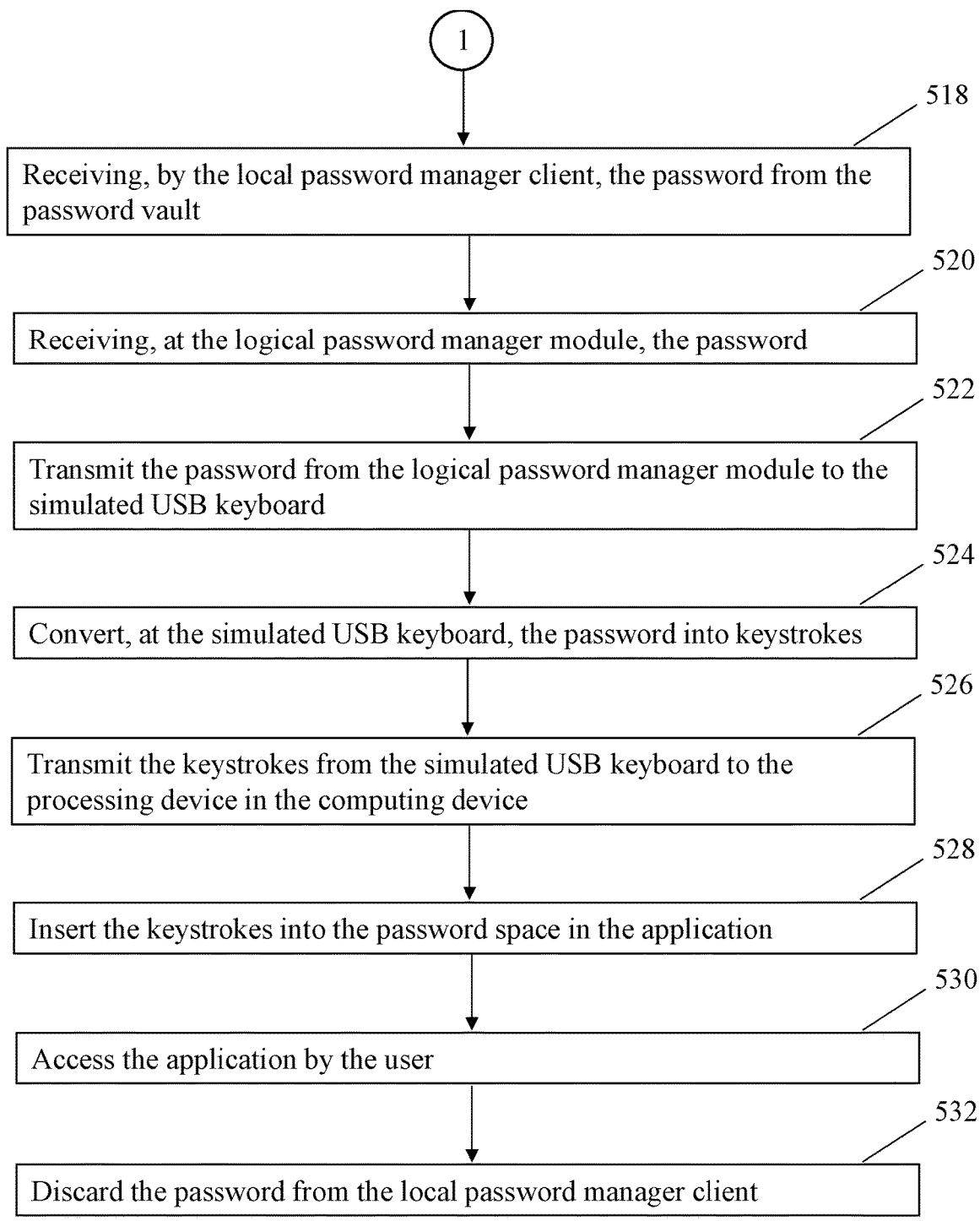
FIG. 5B is a continuation of the flowchart of FIG. 5A, in accordance with some embodiments of the present disclosure.

Referring to FIG. 5B, a continuation of the flowchart of FIG. 5A is presented. Continuing to refer to FIGS. 4 and 5A, the process 500 also includes, subject to the authentication, receiving 518, by the local password manager client 436, the password from the password vault 460 resident in the cloud 450. The logical password manager module 402 receives 520, at the logical password manager module 402 embedded within the accessory 400, via the USB interface 422, the decrypted password from the local password manager client 436. The password is transmitted 522 from the logical password manager module 402 to the simulated USB keyboard 404, also embedded within the accessory 400. The process 500 further includes converting 524, at the simulated USB keyboard 404, the password into one or more keystrokes. The keystrokes are transmitted 526 from the simulated USB keyboard 404 to the processing device 426 via the USB interface 422 and USB hub 424. In one or more embodiments, the keystrokes may include any data of any data format that enables the simulated USB keyboard 404, the processing device 426, and the application 432 in communication with each other as described herein.

In some embodiments, the keystrokes include textual characters and symbols. In some embodiments, keyboard mapping is used to align the password characters with the keyboard characters. In some embodiments, any other type of data structure may be used. For example, a Unicode table may be coupled with a table of Microsoft Windows ALT-codes to enter characters and symbols that are not normally typable on a standard keyboard for a particular locale by simulating the holding down of the ALT key while simulating the entry of the numeric sequence for the desired character. In some embodiments, the password and the keystrokes may either remain encrypted or the keystrokes may be encrypted prior to transmission. In some embodiments, instructions as to how to enter the keystrokes into the password space may be transmitted with the keystrokes. The keystrokes are inserted 528 into the respective password space in the application 432, the user accesses 530 the application 432, and the password is discarded 532 from the logical password manager module 402.

Figure 6:
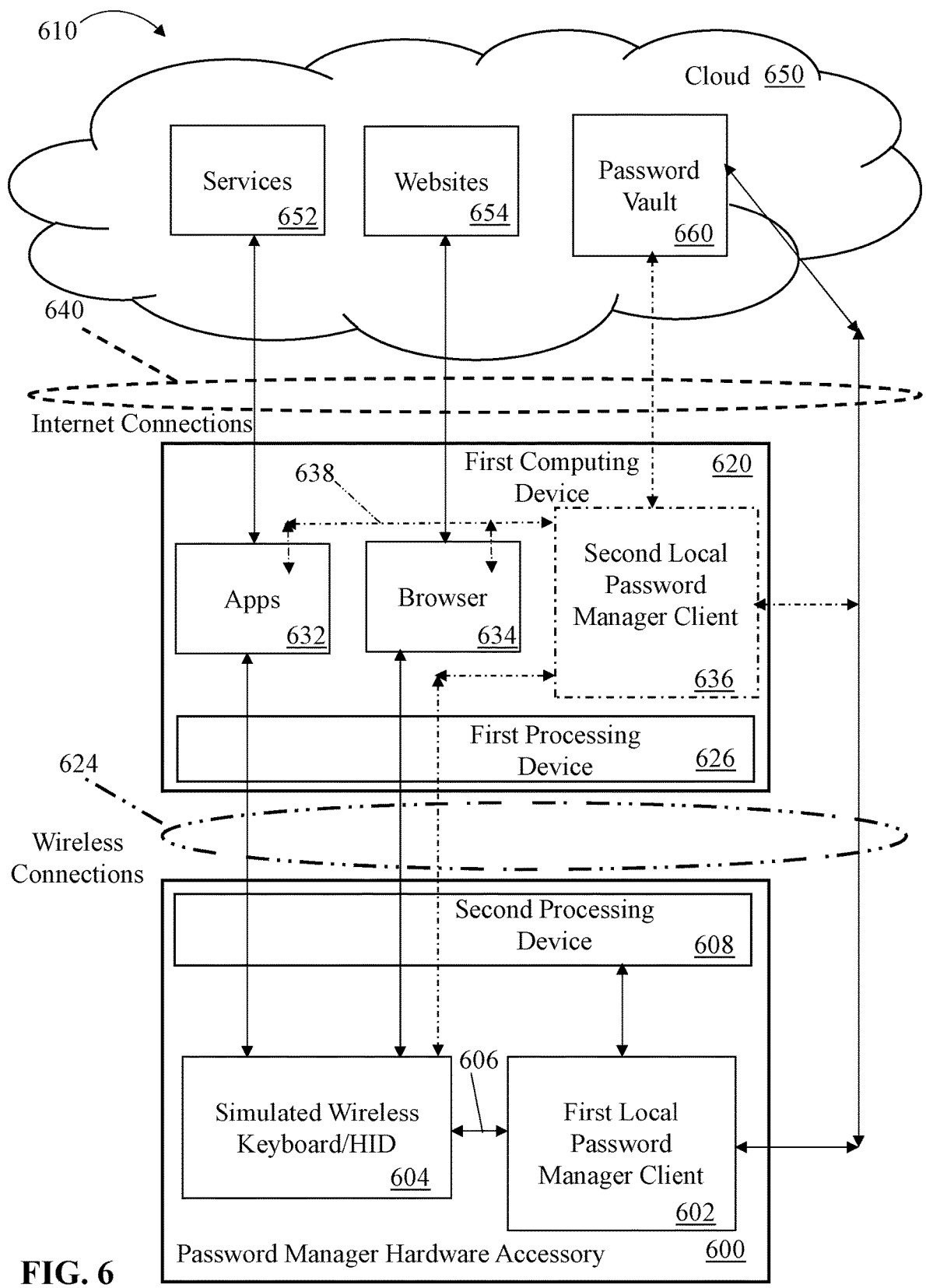
FIG. 6 is a block diagram illustrating an example configuration of a password manager hardware accessory, with embedded logical features, that facilitates communication with a password manager and expeditious text entry in application login dialogue screens, in accordance with some embodiments of the present disclosure.

Referring to FIG. 6, a block diagram is provided illustrating an example configuration of a password manager hardware accessory 600, herein referred to as "the accessory 600," with embedded logical features. Also referring to FIG. 4, in at least some embodiments, the accessory 600 is an electronic apparatus in the form of a second computing device, i.e., a mobile computing device, such as a mobile phone, that facilitates communication with a password manager as well as expeditious text entry in application login dialogue screens. The accessory 600 is shown embedded within a cloud-based computing environment 610 that is similar to the computing environment 50 as shown and described with respect to FIGS. 1 and 2 and the computing environment 410. The computing environment 610 also includes a first computing device 620 and the cloud 650, where the first computing device 620 is similar to the computing system 100 (shown in FIG. 3) and the computing device 420, and the cloud 650 is substantially identical to the cloud 450. In embodiments, the first computing device 620 is a personal computer.

In at least some embodiments, rather than a logical module similar to the logical password manager module 402, the accessory 600 includes a first local password manager client 602 communicatively coupled to a simulated wireless keyboard 604, which may be communicatively coupled using the wireless Bluetooth protocol, infrared, near-field communication (NFC), Wi-Fi or similar short-range wireless protocol. In some embodiments, the simulated wireless keyboard 604 is referred to as a human interface device (HID). The first local password manager client 602 is communicatively coupled to the simulated wireless keyboard 604 through a communications conduit 606, where the communications conduit 606 is any technology that enables communication between the first local password manager client 602 and the simulated wireless keyboard 604 as described herein. In embodiments, the simulated wireless keyboard 604 and the communications conduit 606 are substantially similar to their counterparts 404 and 406, respectively. The first local password manager client 602 is similar to the local password manager client 436, where the first local password manager client 602 is a logical construct that is configured for use on the accessory 600.

In one or more embodiments, the accessory 600 is coupled to the first computing device 620 through a wireless interface through one or more wireless connections 624, e.g., and without limitation, Bluetooth and near field communication (NFC) for a password manager on the PC to control the password manager on the mobile device. The terms wireless interface 624 and wireless connections 624 are therefore used interchangeably herein. Therefore, the accessory 600 is configured as a wireless peripheral device to the first computing device 620 to enable operation of the accessory 600 within the computing environment 610 as described herein. Since the accessory 600 is configured as a mobile computing device such as a mobile phone, the accessory 600 includes a second processing device 608 that is similar to the processing device 104 (shown in FIG. 3), where the computing device includes the first processing device 626 that is substantially similar to the processing device 426. The first local password manager client 602 is communicatively coupled to the second processing device 608.

The first computing device 620 is similar to the computing device 420 in that it provides a platform for one or more applications 632 and browsers 634 that are resident therein. In some embodiments, the first computing device 620 further includes a second password manager client 636 that is, in at least some embodiments, configured as a password management application for a personal computer. As such, in some embodiments, the second password manager client 636 is similar to the local password manager client 436. In some embodiments, the first computing device 620 does not include any password managers. The first computing device 620 is coupled to the cloud 650 through one or more Internet connections 640. A plurality of services 652 and websites 654 are resident within the cloud 650. In addition, one or more password vaults 660 (only one shown) are resident within the cloud 650, where the password vault 660 is similar to the password vault 660. The communicative and operable couplings between the cloud 650 and the first computing device 620 through the Internet connections 640 are similar to those described for the computing environment 410. The second password manager client 636 is communicatively coupled to the browser 634 and the applications 632 through communications channels 638 that are existing channels for soft-entry of passwords directly from the second password manager client 636.

The simulated wireless keyboard 604 is communicatively coupled to the applications 632 and the browser 634 through the second processing device 608 and through the first processing device 626 via the wireless connections 624. The first local password manager client 602 is directly communicatively coupled to the password vault 660 through the wireless connections 624 and the Internet connections 640 in any manner that enables operation of the accessory 600 as described herein. The second local password manager client 636, the communications channels 638, the communicative connections between the second local password manager client 636 and the simulated wireless keyboard 604 and the password vault 660 are shown in dash-dot phantom to illustrate that the second local password manager client 636 is a secondary operative artifact, where the first local password manager client 602 is the principle operative artifact. However, in embodiments, the employment of the first local password manger client 602 and the second password manager client 636 is interchangeable. In at least some embodiments, the accessory 600 is configured to limit its responses to certain application programs in the first computing device 620, such as only responding to the second local password manager client 636 in the first computing device 620 through an authentication process. In such embodiments, the accessory 600 may be understood to ignore communications from applications that are not configured to perform the authentication process. Accordingly, operation of the second local password manager client 636 is similar to that described for the local password manager client 436 as described herein. The authentication features described for the computing environment 410 are substantially reproduced for the computing environment 610 with respect to establishing communications between the accessory 600 and the first computing device 620 and the accessory 600 and the password vault 660.

In one or more embodiments, the first local password manager client 602 is configured to communicate with the password vault 660 to decrypt the passwords in the password vault 660 (or, decrypt a particular password locally at the accessory 600), request, and receive the particular password being sought, through the Internet connections 640 and the wireless connections 624. The first local password manager client 602 is further configured to transmit the password to the virtual keyboard module, i.e., the simulated wireless keyboard 604 via the communications conduit 606. In addition, the simulated wireless keyboard 604 is configured to receive the password from the first local password manager client 602, convert the password to one or more keystrokes, and transmit the one or more keystrokes to the processing device 626 via the second processing device 608 and the wireless connections 624. The simulated wireless keyboard 604 is also configured to receive the password from the second local password manager client 636, convert the password to one or more keystrokes, and transmit the one or more keystrokes to the processing device 626 via the second processing device 608 and the wireless connections 624. In an embodiment, the second local password manager client transmits to the first local password manager client 602 not the password, but only a reference to the password, which the first local password manager client 602 uses to identify which password to retrieve and pass to the simulated keyboard 604. Accordingly, in some embodiments, a request for the password is transmitted by the second local password manager client 636 operating on the first computing device 620 to the first local password manager client 602 on the password manager hardware accessory 600 via the electronic interface, i.e., the wireless connections 624, where the password is identified by reference.

In operation, and as described in further detail herein, a user wirelessly connects the accessory 600 to the first computing device 620 though the wireless connections 624 using one or more authentication protocols as described herein to establish communications therebetween. Specifically, in the illustrated embodiment, the simulated wireless keyboard 604 and the first local password manager client 602 are registered with the first computing device 620 as separate logical entities. The first local password manager client 602 is configured to communicate with the password vault 660 to collect a password from the vault 660 that the user needs for access to either one of the application 632 or the browser 634, and/or the services 652 and websites 654.

The first local password manager client 602 receives an encrypted password (in some embodiments, the password may already be decrypted) that is decrypted through the second processing device 608 and the decrypted password is then transmitted to the first local password manager client 602. The first local password manager client 602 is also configured to transmit, through the communications conduit 606, the password to the simulated wireless keyboard 604 for converting the password through generating individual keystrokes that represent the alphanumerics and symbols typically used to form passwords. The keystrokes are transmitted to the respective logon fields of the application 632 or the browser 634, that in turn may be transmitted to the respective service 652 or website 654 to establish a functional link between the user of the first computing device 620 and the service 652 or the website 654. Upon completion of the conversion of the password to keystrokes and transmission of the keystrokes to the first computing device 620, the password may be maintained within the first local password manager client 602 to facilitate future use of that particular password expeditiously. In at least some embodiments, the user maintains the option to clear the passwords from the accessory 600.

In some embodiments that include both a first local password manager client 602 and the second local password manager client 636, in order to facilitate overcoming the shift from the soft focus of the second password manager client 636 to the browser 634 and the applications 632 through the communications channels 638 (that are existing channels for soft-entry of passwords directly from the second local password manager client 636), the accessory 600 may include logical features resident within the first local password manager client 602. Such logical features may be embodied as a selectable soft control feature configured to control when the keystrokes are sent from the accessory 600 to the computing device 620. Alternatively, in some embodiments, the first local password manager client 602 may be configured to specify a time period, e.g., without limitation, 5 seconds, for the user to click the appropriate focus, i.e., either the existing soft focus through the communications channels 638 or the accessory 600.

Figure 7A:
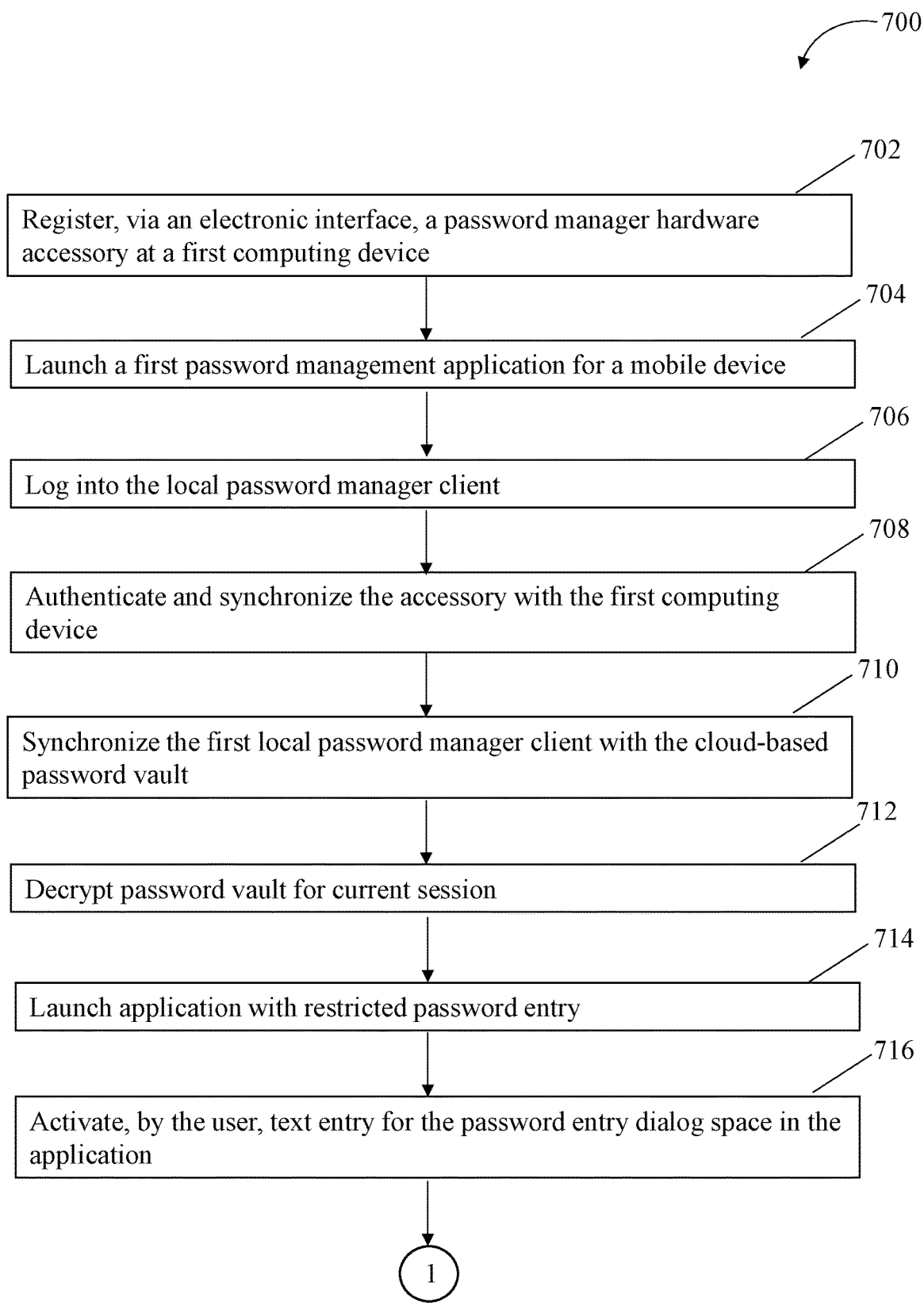
FIG. 7A is a flowchart illustrating a process for using a password manager hardware accessory for communicating with a password manager and facilitating expeditious text entry in application login dialogue screens, in accordance with some embodiments of the present disclosure.

Referring to FIG. 7A, a flowchart is provided illustrating a process 700 for using a password manager hardware accessory, such as the accessory 600 (shown in FIG. 6), for communicating with a password manager, such as the first local password manager client 602 (shown in FIG. 6) and facilitating expeditious text entry in application login dialogue screens. Also referring to FIG. 6, in some embodiments, a user may want to enter a password into the respective password field of an application, browser, service, or website, and encounters text entry restrictions, e.g., there are no soft keyboard entry features associated with the password, i.e., no pasting a copied password permitted in the field, and the user may elect to use the process 700 in conjunction with the accessory 600. Specifically, the process 700 includes registering 702, via an electronic interface, i.e., the wireless connections 624, the accessory 600 at the first computing device 620. The process 700 also includes launching 704, by the user, the first local password manager client 602 as a password management application for a mobile device, such as a smart phone. The user then logs 706 into the first local password manager client 602 through the mobile device.

In embodiments, the second computing device, i.e., the accessory 600 is wirelessly coupled to the first computing device 620 where the registered accessory 600 is authenticated and synchronized 708 with the first computing device 620. The first local password manager client 602 synchronizes 710 with the cloud-based password vault 660 and the first local password manager client 602 decrypts 712 the passwords in the vault 660. In some embodiments, the first local password manager client 602 may pull a copy of the password from the vault 660 and decrypt the password through the processing device 608. The user launches 714 an application 632 on the first computing device 620, where the application 632 includes restricted password entry features. The user may also attempt to launch a password-restricted browser 634, attempt to initialize a password-restricted service 652, or access a password-restricted website 654, with similar restrictive password entry features, where similar actions as described for the application 632 will be executed. The user activates 716 the text entry for the password entry dialog space in the application 632.

Figure 7B:
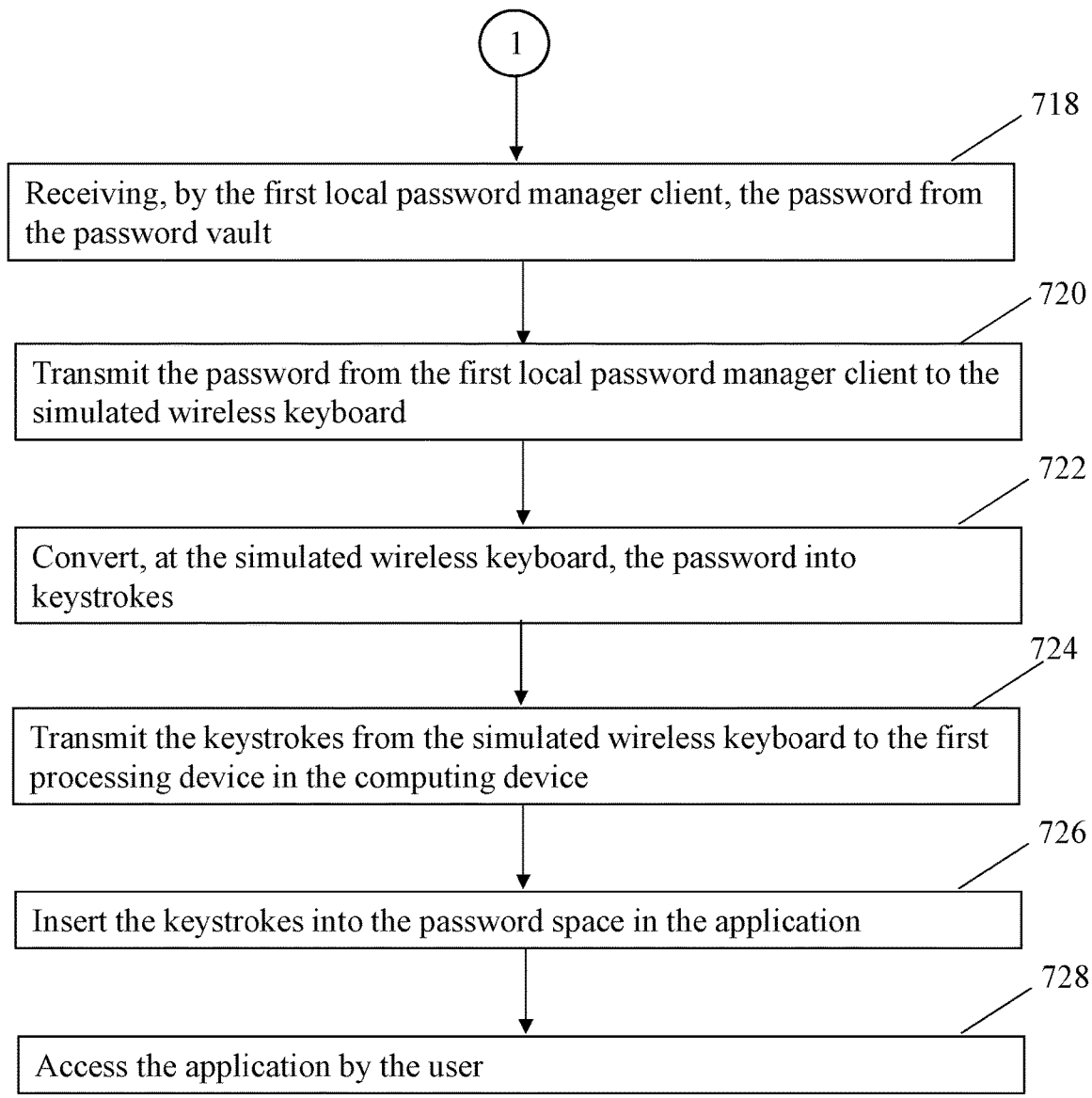
FIG. 7B is a continuation of the flowchart of FIG. 7A, in accordance with some embodiments of the present disclosure.

Referring to FIG. 7B, a continuation of the flowchart of FIG. 7A is presented. Continuing to refer to FIGS. 6 and 7A, the process 700 also includes, subject to the authentication, receiving 718, by the first local password manager client 602, the password from the password vault 660 resident in the cloud 650. The first local password manager client 602 receives an encrypted password (in some embodiments, the password may already be decrypted) that is decrypted through the second processing device 608 and the decrypted password is then transmitted to the first local password manager client 602. The password is transmitted 720 from the first local password manager client 602 to the simulated wireless keyboard 604. The process 700 further includes converting 722, at the simulated wireless keyboard 604, the password into one or more keystrokes. The keystrokes are transmitted 724 from the simulated wireless keyboard 604 to the first processing device 626 within the first computing device 620 via the wireless interface 624. In one or more embodiments, the keystrokes may include any data of any data format that enables the simulated wireless keyboard 604, the first processing device 626, and the application 632 in communication with each other as described herein, and in a manner as described for the computing environment 410 in FIG. 4. The keystrokes are inserted 726 into the respective password space in the application 632 and the user accesses 728 the application 632.

In those embodiments where the first computing device 620 includes a second local password manager client 636, and the user elects not to use the first local password manager client 602, the second local password manager client 636 executes the operations of the process 700 that the first local password manager client 602 would perform.

The apparatus and methods as disclosed herein facilitates overcoming the disadvantages and limitations of known systems, apparatus, and methods for facilitating automated insertion of password credentials into a password field associated with a password-protected feature or application. The apparatus and methods include an operative and communicative coupling between a personal computer and either a USB accessory devices or a mobile device with the necessary logical features resident thereon for cooperation therebetween to establish communications with a cloud-based password vault, retrieve and decrypt the desired password, translate the password into keystrokes and transmit the keystrokes to the personal computer for insertion into the respective field. Such configurations maintain the password vault external to the computing devices and the accessories to improve security. For example, in some embodiments, a cloud-based password vault facilitates allowing the passwords to be accessed from and synchronized across computing devices, whether the hardware accessory is present or not. The USB configuration facilitates the registration of the accessory on the computing device, since the USB protocols on the computing device are typically configured to facilitate multiple devices, including the single accessory as described herein. In addition, communications between the simulated keyboard and logical password manager within the accessory may be completely invisible to the USB network on the personal computer. Similarly, such communications on the mobile device may be invisible to the personal computer. Accordingly, the configurations as described herein eliminate the need for additional internal buses within the computing device to be installed to accommodate the features described herein.

In addition, the embodiments disclosed herein facilitate overcoming text entry restrictions (e.g., features such as not allowing soft keyboard entry and pasting copied passwords in the password field). Therefore, when a user wants to enter a password and encounters such restrictions, the user merely activates the desired password in the password manager, then automatically or manually changes text input focus to the password field, where the accessory generates the hard keystrokes. Notably, the apparatus, systems and methods described herein are substantially agnostic to the various commercially available computing devices (including personal computers, USB devices, and mobile phones) and the respective operating systems.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An electronic apparatus comprising:
   a computing device with an electronic interface, the computing device including a processing device and a local password manager client communicatively coupled to the processing device;
   a password manager hardware accessory, with a virtual keyboard module comprising instructions and a password manager module comprising instructions, coupled to the computing device via a universal serial bus (USB) port on the computing device and the USB port communicatively coupled to the electronic interface, wherein the password manager is configured to be responsive only to the local password manager client;
   a password vault storing an inventory of passwords residing in a cloud-based computing environment communicatively coupled to the local password manager, wherein the local password manager is configured to collect a password from the inventor of passwords and transmit the password to the password manager module; and
   the password manager module configured to:
      transmit the password to the virtual keyboard module for converting to one or more keystrokes by the virtual keyboard module;
      convert, by the virtual keyboard module, the password to the one or more keystrokes;
      transmit, via the electronic interface, each of the one or more keystrokes to a respective logon field of an application on the computing device; and
      discard the password, wherein the password is not stored on the password manager hardware accessory.

2. The electronic apparatus of claim 1, wherein the password manager module is further configured to:
   receive the password from the local password manager client via the electronic interface.

3. The electronic apparatus of claim 1, wherein:
   the local password manager client comprising instructions configured as a password management application for a personal computer.

4. The electronic apparatus of claim 1, wherein:
   the password manager module further comprising instructions configured to ignore communications from at least one application other than the local password manager client.

5. The electronic apparatus of claim 1, wherein the password manager hardware accessory includes an external hard button configured to control the transmit, via the electronic interface the one or more keystrokes to the respective logon field on the computing device.

6. The electronic apparatus of claim 1, wherein the transmit, via the electronic interface, the one or more keystrokes to the respective logon field on the computing device is based on a rate of an average number of keystrokes per unit time.

7. The electronic apparatus of claim 1, further comprising:
   the local password manager client configured to synchronize with the password vault and to decrypt the password from the inventory of passwords.

8. The electronic apparatus of claim 1, wherein the respective logon field on the computing device is activated by a user of the computing device.

9. The electronic apparatus of claim 1, wherein the application includes restricted password entry features.

10. A method comprising:
    registering a password manager hardware accessory with a computing device that includes a processing device, wherein the registering is based on the password manager hardware accessory being coupled to a universal serial bus (USB) port on the computing device;
    receiving, at a password manager module embedded within the password manager hardware accessory, via an electronic interface, a password from a local password manager client from the computing device via the processing device, wherein the password from a password inventory associated with a password vault in a cloud-based computing environment, and wherein the password manager module is responsive only to the local password manager client;
    transmitting, from the password manager module to a virtual keyboard module embedded within the password manager hardware accessory via a communications conduit, the password;
    converting, at the virtual keyboard module, the password into one or more keystrokes for entry into a respective logon field of an application;
    transmitting, from the virtual keyboard module to the processing device via the electronic interface, each of the one or more keystrokes for entry into the respective logon field of the application;
    discarding, from the password manager module on the password manager hardware accessory, the password.

11. The method of claim 10, wherein the local password manager client is a password management application for a personal computer.

12. The method of claim 10, wherein the password manager module is configured to ignore communication from at least one local application other than the local password manager client.

13. The method of claim 10, wherein transmitting, from the virtual keyboard module to the processing device via the electronic interface, the one or more keystrokes to the respective logon field is based on a user input on an external control on the password manager hardware accessory.

14. The method of claim 10, wherein the transmitting, from the virtual keyboard module to the processing device via the electronic interface, the one or more keystrokes to the respective logon field is based on a rate of an average number of keystrokes per unit time.

15. The method of claim 10, wherein the local password manager client is synchronized with the password vault and wherein the password from the local password manager client is decrypted.

16. The method of claim 10, further comprising:
    activating, via a user input on the electronic interface, the respective logon field.

17. The method of claim 10, wherein the application includes restricted password entry features.

* * * * *